United States Patent Office.

GARDNER WARREN, OF ROXBURY, MASSACHUSETTS.

Letters Patent No. 75,608, dated March 17, 1868; antedated March 6, 1868.

IMPROVEMENT IN EXTRACTING TANNIN FROM BARK.

The Schedule referred to in these Letters Patent and making part of the same.

TO ALL WHOM IT MAY CONCERN:

Be it known that I, GARDNER WARREN, of Roxbury, in the county of Norfolk, and State of Massachusetts, have invented a new and useful Mode for the Treatment of Bark, in a Process for Obtaining Extracts of its Tanning or other Properties; and I do hereby declare the following to be a correct description of the same.

For the purpose of making myself more clearly understood, I shall divide the following description of my said invention into as many articles as there are different stages in the progress of the process. I will say, then, that—

First. I steam the bark in a suitable apparatus provided for that purpose, the action of the steam being to open the pores thereof, and to expel the air therefrom, so as to admit of its being rapidly saturated with water in a perfect manner.

Second. Having steamed the bark for a length of time suitable to the end of the purpose just set forth, I then immerse it in water, which, by condensing the steam, speedily penetrates every pore of the bark, absorbing a portion of the soluble or tanning properties thereof.

Third. In the method which I prefer, the bark, after having been sufficiently saturated with the water for a length of time sufficient for it to have dissolved to the water that part of the tanning property that is first and most speedily yielded to said solvent, is taken and passed between pressing-rollers, of any suitable construction, operated by proper machinery, being thereby subjected to a pressure that will expel from its pores the liquor formed by the combination of the water with the soluble properties of said bark.

Fourth. The bark, as it is taken from the rollers, is again steamed, saturated with water, and passed between the rollers, as just set forth, and this operation is repeated until all of the tanning property is extracted, about three repetitions of the operation being found the most desirable.

Fifth. The liquors obtained by the several operations are kept separated, so that those obtained from the first, second, and third thereof are kept distinct, the one from the other. If the rollers or other means of pressure were not used, and a process of leaching were substituted therefor, I would make the same subdivision thereof as I do when the pressure-rollers are used, keeping the liquor produced by the first, second, and third leachings separate from each other.

Sixth. The liquors thus obtained are now subjected to an evaporating process, reducing the extract to any required consistency for marketing, the divisions of the liquor being preserved so as to form the same numbers and qualities of the extract so obtained. The great advantage results from the separation of the extract obtained into two or more qualities, for, in extracting the tanning property of bark, it will be found that the part thereof which is first yielded to the water is of superior quality for use in tanning calf-skins and other of the finer qualities of leather, as it renders it softer and more pliable than if the same were tanned in a liquor that had absorbed the whole or the greater part of the tanning property of a given quantity of bark.

From this it is apparent that the division of the tanning-extracts into two or more grades or qualities is of great value, as that part or quality which will produce leather of the softest and most pliable texture may be used in the manufacture of that which will have its market value the most enhanced by being possessed of those qualities, such as calf and kip-skins, and that grade which produces the harshest and least pliable leather may be used with the best advantage in producing such kind of leather as requires to be more rigid and firm. For this reason, I deem it best that the extract should be separated into three grades, the first of which could be used for tanning calf-skin and other fine qualities of leather; the second, for producing cow-hides and other heavy grades; and the third, for manufacturing sole-leather.

The value of my invention is found, in part, in the saving of time wherein the tannin is extracted from the bark; and further, and to a much greater degree, its value is found in the grading of the extracts obtained, so that the finer qualities of leather may be produced of a softer and more flexible texture than any now known to the trade; and for the purpose of keeping these qualities of the extracts as distinct as possible, I make the first pressure of the bark in the rollers much less than in the subsequent operations, as the properties that go to make up the first extract are more soluble than the others.

What I claim, and desire to secure by Letters Patent, is—

1. The method of treating bark, for the purpose of obtaining its tanning or other qualities, by the three operations of steaming, soaking, and squeezing the same, substantially as described.

2. The method of preparing several qualities of extracts from the same bark, by preserving the products of the several successive pressings separate from each other, substantially as described.

Executed this 14th day of August, 1867.

GARDNER WARREN.

Witnesses:
 CHAS. A. JORDAN,
 WM. C. HIBBARD.